United States Patent [19]

Steele, Jr. et al.

[11] Patent Number: 4,827,403
[45] Date of Patent: May 2, 1989

[54] VIRTUAL PROCESSOR TECHNIQUES IN A SIMD MULTIPROCESSOR ARRAY

[75] Inventors: Guy L. Steele, Jr., Lexington; W. Daniel Hillis, Brookline; Guy Blelloch, Cambridge; Michael Drumbeller, Belmont; Brewster Kahle, Somerville; Clifford Lasser, Boston, all of Mass.; Abhiram Ranade, New Haven, Conn.; James Salem, Waltham; Karl Sims, Somerville, both of Mass.

[73] Assignee: Thinking Machines Corporation, Cambridge, Mass.

[21] Appl. No.: 933,810

[22] Filed: Nov. 24, 1986

[51] Int. Cl.$^4$ .............................................. G06F 15/16
[52] U.S. Cl. .................................................... 364/200
[58] Field of Search ... 364/200 MS File, 900 MS File, 364/730

[56] References Cited

U.S. PATENT DOCUMENTS

| | | | |
|---|---|---|---|
| 3,573,852 | 4/1971 | Watson et al. | 364/200 |
| 4,101,960 | 7/1978 | Stokes et al. | 364/200 |
| 4,380,046 | 4/1983 | Fung | 364/200 |
| 4,435,758 | 3/1984 | Lorie et al. | 364/200 |
| 4,481,580 | 11/1984 | Martin et al. | 364/200 |
| 4,523,273 | 6/1985 | Adams, III et al. | 364/200 |
| 4,591,981 | 5/1986 | Kassabov | 364/200 |
| 4,621,339 | 11/1986 | Wagner et al. | 364/900 |

OTHER PUBLICATIONS

IEEE Computer Society Workshop of Computer Architecture for Pattern Analysis and Image Database Management, 11/81, pp. 201–208.

Primary Examiner—Raulfe B. Zache
Assistant Examiner—Florin Munteanu
Attorney, Agent, or Firm—Wolf, Greenfield & Sacks

[57] ABSTRACT

A virtual processor mechanism and specific techniques and instructions for utilizing such virtual processor mechanism within an SIMD computer having numerous processors, and each physical processor having dedicated memory associated therewith. Each physical processor is used to simulate multiple "virtual" processors, with each physical processor simulating the same number of virtual processors. The memory of each physical processor is divided into n regions of equal size, each such region being allocated to one virtual processor, where n is the number of virtual processors simulated by each physical processor. Whenever an instruction is processed, each physical processor is time-sliced among the virtual memory regions, performing the operation first as one virtual processor, then another, until the operation has been performed for all virtual processors. Physical processors are switched among the virtual processors in a completely regular, predictable, deterministic fashion. The virtual processor mechanism switches among virtual processors within instructions, so that at the completion of each instruction, it has been executed on behalf of all virtual processors. A number of instructions are shown for execution using these virtual processor techniques.

4 Claims, 42 Drawing Sheets

|  | P0 | P1 | P2 | P3 | P4 | P5 | P6 | P7 |
|---|---|---|---|---|---|---|---|---|
| PER-PHYSICAL-PROCESSOR HOUSEKEEPING AREA (r, q) | | | | | | | | 4095 |
| VP-BANK 3 (b, a) | ● 9 / -3 | ○ 4 / 5 | ● 9 / 2 | ○ 6 / -4 | ○ -1 / -2 | ● 3 / -4 | ○ -1 / 1 | ○ -2 / 6 |
| VP-BANK 2 (b, a) | ● 0 / 9 | ● 6 / 7 | ○ 1 / 6 | ○ 9 / 5 | ● 8 / 3 | ● 8 / 4 | ○ 5 / 3 | ● 3 / 5 |
| VP-BANK 1 (b, a) | ○ -4 / -4 | ● 3 / 1 | ● -2 / 4 | ● -4 / -2 | ● -2 / 6 | ● 7 / -4 | ● -1 / 3 | ● 2 / 5 |
| VP-BANK 0 (b, a) | ● -2 / 11 | ○ 0 / 8 | ○ 7 / 3 | ● 7 / 11 | ● 6 / 6 | ○ 7 / 3 | ○ 6 / 6 | ● 7 / 11  0 |

FIG. 3

|  | P0 | P1 | P2 | P3 | P4 | P5 | P6 | P7 |
|---|---|---|---|---|---|---|---|---|
| PER-PHYSICAL-PROCESSOR HOUSE-KEEPING AREA | | | | | | | | 4095 |
| VP-BANK 3  b / a | • 9 / -3 | ○ 4 / 5 | • 9 / 2 | ○ 6 / -4 | ○ -1 / -2 | • 3 / -4 | ○ -1 / 1 | ○ -2 / 6 |
| VP-BANK 2  b / a | • 0 / 9 | • 6 / 7 | ○ 1 / 6 | ○ 9 / 5 | ○ 8 / 3 | • 8 / 4 | ○ 5 / 3 | • 3 / 5 |
| VP-BANK 1  b / a | ○ -4 / -4 | • 3 / 1 | • -2 / 4 | • -4 / -2 | • -2 / 6 | • 7 / -4 | • -1 / 3 | • 2 / 5 |
| VP-BANK 0  b / a | • -2 / 9 | ○ 0 / 8 | ○ 7 / 3 | • 7 / 18 | • 6 / 12 | ○ 7 / 3 | ○ 6 / 6 | • 7 / 18 |

FIG. 4

|  | P0 | P1 | P2 | P3 | P4 | P5 | P6 | P7 |
|---|---|---|---|---|---|---|---|---|
| PER-PHYSICAL-PROCESSOR HOUSE-KEEPING AREA | | | | | | | | 4095 |
| VP-BANK 3 b/a | ● 9 / -3 | ○ 4 / 5 | ● 9 / 2 | ○ 6 / -4 | ○ -1 / -2 | ● 3 / -4 | ○ -1 / 1 | ○ -2 / 6 |
| VP-BANK 2 b/a | ● 0 / 9 | ● 6 / 7 | ○ 1 / 6 | ○ 9 / 5 | ○ 8 / 3 | ● 8 / 4 | ○ 5 / 3 | ● 3 / 5 |
| VP-BANK 1 b/a | ○ -4 / -4 | ● 3 / 4 | ● -2 / 2 | ● -4 / -6 | ● -2 / 4 | ● 7 / 3 | ● -1 / -2 | ● 2 / 7 |
| VP-BANK 0 b/a | ● -2 / 9 | ○ 0 / 8 | ○ 7 / 3 | ● 7 / 18 | ● 6 / 12 | ○ 7 / 3 | ○ 6 / 6 | ● 7 / 18 |
| | P0 | P1 | P2 | P3 | P4 | P5 | P6 | P7 → 0 |

FIG. 5

|  | P0 | P1 | P2 | P3 | P4 | P5 | P6 | P7 |
|---|---|---|---|---|---|---|---|---|
| PER-PHYSICAL-PROCESSOR HOUSE-KEEPING AREA | | | | | | | | 4095 |
| VP-BANK 3 b<br>a | ● 9<br>-3 | ○ 4<br>5 | ● 9<br>2 | ○ 6<br>-4 | ○ -1<br>-2 | ● 3<br>-4 | ○ -1<br>1 | ○ -2<br>6 |
| VP-BANK 2 b<br>a | ● 0<br>9 | ● 6<br>13 | ○ 1<br>6 | ○ 9<br>5 | ○ 8<br>3 | ● 8<br>12 | ○ 5<br>3 | ● 3<br>8 |
| VP-BANK 1 b<br>a | ○ -4<br>-4 | ● 3<br>4 | ● -2<br>2 | ● -4<br>-6 | ● -2<br>4 | ● 7<br>3 | ● -1<br>2 | ● 2<br>7 |
| VP-BANK 0 b<br>a | ● -2<br>9 | ○ 0<br>8 | ○ 7<br>3 | ● 7<br>18 | ● 6<br>12 | ○ 7<br>3 | ○ 6<br>6 | ● 7<br>18 |

FIG. 6

|  | | | | | | | | 4095 |
|---|---|---|---|---|---|---|---|---|
| PER-PHYSICAL-PROCESSOR HOUSE-KEEPING AREA $r$ $q$ | | | | | | | | |
| VP-BANK 3 $b$ $a$ | ● 9 6 | ○ 4 5 | ● 9 11 | ○ 6 −4 | ○ −1 −2 | ● 3 −1 | ○ −1 1 | ○ −2 6 | ← |
| VP-BANK 2 $b$ $a$ | ● 0 9 | ● 6 13 | ○ 1 6 | ○ 9 5 | ○ 8 3 | ● 8 12 | ○ 5 3 | ● 3 8 | |
| VP-BANK 1 $b$ $a$ | ○ −4 −4 | ● 3 4 | ● −2 2 | ● −4 −6 | ● −2 4 | ● 7 3 | ● −1 2 | ● 2 7 | |
| VP-BANK 0 $b$ $a$ | ● −2 9 | ○ 0 8 | ○ 7 3 | ● 7 18 | ● 6 12 | ○ 7 3 | ○ 6 6 | ● 7 18 | 0 |
| | P0 | P1 | P2 | P3 | P4 | P5 | P6 | P7 | |

FIG.7

|  | P0 | P1 | P2 | P3 | P4 | P5 | P6 | P7 |
|---|---|---|---|---|---|---|---|---|
| PER-PHYSICAL-PROCESSOR HOUSE-KEEPING AREA (r, q) | | | | | | | | 4095 |
| VP-BANK 3 (b, a) | • 9 | ○ 4 | • 9 | ○ 6 | ○ -1 | • 3 | ○ -1 | ○ -2 |
| VP-BANK 2 (b, a) | • 0 | • 6 | ○ 1 | ○ 9 | ○ 8 | • 8 | ○ 5 | • 3 |
| VP-BANK 1 (b, a) | ○ -4 | • 3 | • -2 | • -4 | • -2 | • 7 | • -1 | • 2 |
| VP-BANK 0 (b, a) | • -2 | ○ 0 | ○ 7 | • 7 | • 6 | ○ 7 | ○ 6 | • 7 |

|  | P0 | P1 | P2 | P3 | P4 | P5 | P6 | P7 |
|---|---|---|---|---|---|---|---|---|
| PER-PHYSICAL-PROCESSOR HOUSE-KEEPING AREA  r q | -2 | 3 | -2 | 3 | 4 | 7 | -1 | 9 | ← 4095
| VP-BANK 3  b a | • 9 | ○ 4 | • 9 | ○ 6 | ○ -1 | • 3 | ○ -1 | ○ -2 |
| VP-BANK 2  b a | • 0 | • 6 | ○ 1 | ○ 9 | ○ 8 | • 8 | ○ 5 | • 3 |
| VP-BANK 1  b a | ○ -4 | • 3 | • -2 | • -4 | • -2 | • 7 | • -1 | • 2 |
| VP-BANK 0  b a | • -2 | ○ 0 | ○ 7 | • 7 | • 6 | ○ 7 | ○ 6 | • 7 | 0

FIG. 14

|  | | | | | | | | | 4095 |
|---|---|---|---|---|---|---|---|---|---|

PER-
PHYSICAL-
PROCESSOR
HOUSE-
KEEPING
AREA

| | r | | | | | | | | |
|---|---|---|---|---|---|---|---|---|---|
| | q | -2 | 9 | -2 | 3 | 4 | 15 | -1 | 12 | ←
| VP-BANK 3 | b<br>a | • 9 | ○ 4 | • 9 | ○ 6 | ○ -1 | • 3 | ○ -1 | ○ -2 |
| VP-BANK 2 | b<br>a | • 0 | • 6 | ○ 1 | ○ 9 | ○ 8 | • 8 | ○ 5 | • 3 |
| VP-BANK 1 | b<br>a | ○ -4 | • 3 | • -2 | • -4 | • -2 | • 7 | • -1 | • 2 |
| VP-BANK 0 | b<br>a | • -2 | ○ 0 | ○ 7 | • 7 | • 6 | ○ 7 | ○ 6 | • 7 | 0
| | | P0 | P1 | P2 | P3 | P4 | P5 | P6 | P7 |

FIG.15

PER-
PHYSICAL-
PROCESSOR
HOUSE-
KEEPING
AREA

| | P0 | P1 | P2 | P3 | P4 | P5 | P6 | P7 |
|---|---|---|---|---|---|---|---|---|
| r |  |  |  |  |  |  |  | 4095 |
| q | 7 | 9 | 7 | 3 | 4 | 18 | −1 | 12 |
| VP-BANK 3 b/a | • 9 | ○ 4 | • 9 | ○ 6 | ○ −1 | • 3 | ○ −1 | ○ −2 |
| VP-BANK 2 b/a | • 0 | • 6 | ○ 1 | ○ 9 | ○ 8 | • 8 | ○ 5 | • 3 |
| VP-BANK 1 b/a | ○ −4 | • 3 | • −2 | • −4 | • −2 | • 7 | • −1 | • 2 |
| VP-BANK 0 b/a | • −2 | ○ 0 | ○ 7 | • 7 | • 6 | ○ 7 | ○ 6 | • 7 |

|  | 59 | | | | | | | |
|---|---|---|---|---|---|---|---|---|
| PER-PHYSICAL-PROCESSOR HOUSE-KEEPING AREA | | PHYSICAL-GLOBAL-ADD-ALWAYS | | | | | | 4095 |
| | r | | | | | | | |
| | q 7 | 9 | 7 | 3 | 4 | 18 | -1 | 12 |
| VP-BANK 3 | b •9 | ○4 | •9 | ○6 | ○-1 | •3 | ○-1 | ○-2 |
| VP-BANK 2 | b •0 | •6 | ○1 | ○9 | ○8 | •8 | ○5 | •3 |
| VP-BANK 1 | b ○-4 | •3 | •-2 | •-4 | •-2 | •7 | •-1 | •2 |
| VP-BANK 0 | b •-2 | ○0 | ○7 | •7 | •6 | ○7 | ○6 | •7 |
| | P0 | P1 | P2 | P3 | P4 | P5 | P6 | P7  0 |

FIG.17

|  | | | | | | | | 4095 |
|---|---|---|---|---|---|---|---|---|
| PER-PHYSICAL-PROCESSOR HOUSE-KEEPING AREA $\begin{matrix}r\\q\end{matrix}$ | -2 | 0 | 7 | 7 | 6 | 7 | 6 | 7 ← |
| VP-BANK 3 $\begin{matrix}b\\a\end{matrix}$ | • 9 | • 4 | • 9 | • 6 | • -1 | • 3 | • -1 | • -2 |
| VP-BANK 2 $\begin{matrix}b\\a\end{matrix}$ | • 0 | • 6 | • 1 | • 9 | • 8 | • 8 | • 5 | • 3 |
| VP-BANK 1 $\begin{matrix}b\\a\end{matrix}$ | • -4 | • 3 | • -2 | • -4 | • -2 | • 7 | • -1 | • 2 |
| VP-BANK 0 $\begin{matrix}b\\a\end{matrix}$ | • -2 | • 0 | • 7 | • 7 | • 6 | • 7 | • 6 | • 7 |
|  | P0 | P1 | P2 | P3 | P4 | P5 | P6 | P7  0 |

FIG. 21

|  | P0 | P1 | P2 | P3 | P4 | P5 | P6 | P7 |  |
|---|---|---|---|---|---|---|---|---|---|
| PER-PHYSICAL-PROCESSOR HOUSE-KEEPING AREA $\begin{smallmatrix}r\\q\end{smallmatrix}$ | -6 | 3 | 5 | 3 | 4 | 14 | 5 | 9 | 4095 ← |
| VP-BANK 3 $\begin{smallmatrix}b\\a\end{smallmatrix}$ | • 9 | • 4 | • 9 | • 6 | • -1 | • 3 | • -1 | • -2 | |
| VP-BANK 2 $\begin{smallmatrix}b\\a\end{smallmatrix}$ | • 0 | • 6 | • 1 | • 9 | • 8 | • 8 | • 5 | • 3 | |
| VP-BANK 1 $\begin{smallmatrix}b\\a\end{smallmatrix}$ | • -4 | • 3 | • -2 | • -4 | • -2 | • 7 | • -1 | • 2 | |
| VP-BANK 0 $\begin{smallmatrix}b\\a\end{smallmatrix}$ | • -2 | • 0 | • 7 | • 7 | • 6 | • 7 | • 6 | • 7 | 0 |

FIG.22

|  | P0 | P1 | P2 | P3 | P4 | P5 | P6 | P7 |
|---|---|---|---|---|---|---|---|---|
| PER-PHYSICAL-PROCESSOR HOUSE-KEEPING AREA  r q | -6 | 9 | 6 | 12 | 12 | 22 | 10 | 12 |
| VP-BANK 3  b a | •9 | •4 | •9 | •6 | •-1 | •3 | •-1 | •-2 |
| VP-BANK 2  b a | •0 | •6 | •1 | •9 | •8 | •8 | •5 | •3 |
| VP-BANK 1  b a | •-4 | •3 | •-2 | •-4 | •-2 | •7 | •-1 | •2 |
| VP-BANK 0  b a | •-2 | •0 | •7 | •7 | •6 | •7 | •6 | •7 |

|  | P0 | P1 | P2 | P3 | P4 | P5 | P6 | P7 |
|---|---|---|---|---|---|---|---|---|
| PER-PHYSICAL-PROCESSOR HOUSE-KEEPING AREA | 3 | 13 | 15 | 18 | 11 | 25 | 9 | 10 |
| VP-BANK 3 | 9 | 4 | 9 | 6 | -1 | 3 | -1 | -2 |
| VP-BANK 2 | 0 | 6 | 1 | 9 | 8 | 8 | 5 | 3 |
| VP-BANK 1 | -4 | 3 | -2 | -4 | -2 | 7 | -1 | 2 |
| VP-BANK 0 | -2 | 0 | 7 | 7 | 6 | 7 | 6 | 7 |

FIG. 24

|  | | | | | | | | | 4095 |
|---|---|---|---|---|---|---|---|---|---|
| PER-PHYSICAL-PROCESSOR HOUSEKEEPING AREA | r | 0 | 3 | 16 | 31 | 49 | 60 | 85 | 94 | ← |
| | q | 3 | 13 | 15 | 18 | 11 | 25 | 9 | 10 | |
| VP-BANK 3 | b / a | • 9 | • 4 | • 9 | • 6 | • −1 | • 3 | • −1 | • −2 | |
| VP-BANK 2 | b / a | • 0 | • 6 | • 1 | • 9 | • 8 | • 8 | • 5 | • 3 | |
| VP-BANK 1 | b / a | • −4 | • 3 | • −2 | • −4 | • −2 | • 7 | • −1 | • 2 | |
| VP-BANK 0 | b / a | • −2 | • 0 | • 7 | • 7 | • 6 | • 7 | • 6 | • 7 | 0 |
| | | P0 | P1 | P2 | P3 | P4 | P5 | P6 | P7 | |

FIG. 25

| | P0 | P1 | P2 | P3 | P4 | P5 | P6 | P7 |
|---|---|---|---|---|---|---|---|---|
| PER-PHYSICAL-PROCESSOR HOUSEKEEPING AREA  r | -2 | 3 | 23 | 38 | 55 | 67 | 91 | 101 |
| q | 3 | 13 | 15 | 18 | 11 | 25 | 9 | 10 |
| VP-BANK 3  b | • 9 | • 4 | • 9 | • 6 | • -1 | • 3 | • -1 | • -2 |
| a | | | | | | | | |
| VP-BANK 2  b | • 0 | • 6 | • 1 | • 9 | • 8 | • 8 | • 5 | • 3 |
| a | | | | | | | | |
| VP-BANK 1  b | • -4 | • 3 | • -2 | • -4 | • -2 | • 7 | • -1 | • 2 |
| a | | | | | | | | |
| VP-BANK 0  b | • -2 | • 0 | • 7 | • 7 | • 6 | • 7 | • 6 | • 7 |
| a | 0 | 3 | 16 | 31 | 49 | 60 | 85 | 94 |

4095 (top right), 0 (bottom right)

FIG. 26

|  | P0 | P1 | P2 | P3 | P4 | P5 | P6 | P7 |
|---|---|---|---|---|---|---|---|---|
PER-PHYSICAL-PROCESSOR HOUSE-KEEPING AREA $r$ | -6 | 6 | 21 | 34 | 53 | 74 | 90 | 103 |
$q$ | 3 | 13 | 15 | 18 | 11 | 25 | 9 | 10 |
VP-BANK 3 $b$ / $a$ | •9 | •4 | •9 | •6 | •-1 | •3 | •-1 | •-2 |
VP-BANK 2 $b$ / $a$ | •0 | •6 | •1 | •9 | •8 | •8 | •5 | •3 |
VP-BANK 1 $b$ / $a$ | •-4 / -2 | •3 / 3 | •-2 / 23 | •-4 / 38 | •-2 / 55 | •7 / 67 | •-1 / 91 | •2 / 101 |
VP-BANK 0 $b$ / $a$ | •-2 / 0 | •0 / 3 | •7 / 16 | •7 / 31 | •6 / 49 | •7 / 60 | •6 / 85 | •7 / 94 |

4095 (top right), 0 (bottom right)

FIG. 27

|  | P0 | P1 | P2 | P3 | P4 | P5 | P6 | P7 |
|---|---|---|---|---|---|---|---|---|
| PER-PHYSICAL-PROCESSOR HOUSE-KEEPING AREA  $r$ | −6 | 12 | 22 | 43 | 61 | 82 | 95 | 106 |
| $q$ | 3 | 13 | 15 | 18 | 11 | 25 | 9 | 10 |
| VP-BANK 3  $b$ | •9 | •4 | •9 | •6 | •−1 | •3 | •−1 | •−2 |
| $a$ |  |  |  |  |  |  |  |  |
| VP-BANK 2  $b$ | •0 | •6 | •1 | •9 | •8 | •8 | •5 | •3 |
| $a$ | −6 | 6 | 21 | 34 | 53 | 74 | 90 | 103 |
| VP-BANK 1  $b$ | •−4 | •3 | •−2 | •−4 | •−2 | •7 | •−1 | •2 |
| $a$ | −2 | 3 | 23 | 38 | 55 | 67 | 91 | 101 |
| VP-BANK 0  $b$ | •−2 | •0 | •7 | •7 | •6 | •7 | •6 | •7 |
| $a$ | 0 | 3 | 16 | 31 | 49 | 60 | 85 | 94 |

FIG. 28

| | P0 | P1 | P2 | P3 | P4 | P5 | P6 | P7 | |
|---|---|---|---|---|---|---|---|---|---|
| PER-PHYSICAL-PROCESSOR HOUSEKEEPING AREA  r | 3 | 16 | 31 | 49 | 60 | 85 | 94 | 104 | 4095 |
| q | 3 | 13 | 15 | 18 | 11 | 25 | 9 | 10 | |
| VP-BANK 3  b | •9 | •4 | •9 | •6 | •-1 | •3 | •-1 | •-2 | ← |
| a | -6 | 12 | 22 | 43 | 61 | 82 | 95 | 106 | |
| VP-BANK 2  b | •0 | •6 | •1 | •9 | •8 | •8 | •5 | •3 | |
| a | -6 | 6 | 21 | 34 | 53 | 74 | 90 | 103 | |
| VP-BANK 1  b | •-4 | •3 | •-2 | •-4 | •-2 | •7 | •-1 | •2 | |
| a | -2 | 3 | 23 | 38 | 55 | 67 | 91 | 101 | |
| VP-BANK 0  b | •-2 | •0 | •7 | •7 | •6 | •7 | •6 | •7 | |
| a | 0 | 3 | 16 | 31 | 49 | 60 | 85 | 94 | 0 |

FIG. 29

|  | P0 | P1 | P2 | P3 | P4 | P5 | P6 | P7 |
|---|---|---|---|---|---|---|---|---|
| PER-PHYSICAL-PROCESSOR HOUSE-KEEPING AREA | | | | | | | | 4095 |
| VP-BANK 3 | 9 | 4 | 9 | 6 | −1 | 3 | −1 | −2 |
| VP-BANK 2 | 0 | 6 | 1 | 9 | 8 | 8 | 5 | 3 |
| VP-BANK 1 | −4 | 3 | −2 | −4 | −2 | 7 | −1 | 2 |
| VP-BANK 0 | −2 | 0 | 7 | 7 | 6 | 7 | 6 | 7 |

FIG. 32

| | P0 | P1 | P2 | P3 | P4 | P5 | P6 | P7 |
|---|---|---|---|---|---|---|---|---|
| PER-PHYSICAL-PROCESSOR HOUSE-KEEPING AREA | | | | | | | | 4095 |
| VP-BANK 3 | • 9 | • 4 | • 9 | • 6 | • -1 | • 3 | • -1 | • -2 |
| VP-BANK 2 | • 0 | • 6 | • 1 | • 9 | • 8 | • 8 | • 5 | • 3 |
| VP-BANK 1 | • -4 | • 3 | • -2 | • -4 | • -2 | • 7 | • -1 | • 2 |
| VP-BANK 0 | • -2 / -4 | • 0 / 3 | • 7 / -2 | • 7 / -4 | • 6 / -2 | • 7 / 7 | • 6 / -1 | • 7 / 2 |

|              | P0 | P1 | P2 | P3 | P4 | P5 | P6 | P7 |
|---|---|---|---|---|---|---|---|---|
| PER-PHYSICAL-PROCESSOR HOUSE-KEEPING AREA  r q |  |  |  |  |  |  |  | 4095 |
| VP-BANK 3  b a | •9 | •4 | •9 | •6 | •−1 | •3 | •−1 | •−2 |
| VP-BANK 2  b a | •0 9 | •6 4 | •1 9 | •9 6 | •8 −1 | •8 3 | •5 −1 | •3 −2 | ←
| VP-BANK 1  b a | •−4 0 | •3 7 | •−2 7 | •−4 −2 | •−2 7 | •7 6 | •−1 7 | •2 6 |
| VP-BANK 0  b a | •−2 −4 | •0 3 | •7 −2 | •7 −4 | •6 −2 | •7 7 | •6 −1 | •7 2 | 0

FIG.35

|  | P0 | P1 | P2 | P3 | P4 | P5 | P6 | P7 |
|---|---|---|---|---|---|---|---|---|
| VP-BANK 3 b/a | 9/6 | 4/1 | 9/9 | 6/0 | -1/8 | 3/5 | -1/3 | -2/8 |
| VP-BANK 2 b/a | 0/9 | 6/4 | 1/9 | 9/6 | 8/-1 | 8/3 | 5/-1 | 3/-2 |
| VP-BANK 1 b/a | -4/0 | 3/7 | -2/7 | -4/-2 | -2/7 | 7/6 | -1/7 | 2/6 |
| VP-BANK 0 b/a | -2/-4 | 0/3 | 7/-2 | 7/-4 | 6/-2 | 7/7 | 6/-1 | 7/2 |

FIG. 36

|  | NORTH | | | | | | |
|---|---|---|---|---|---|---|---|
| P0 BANK 0 | P0 BANK 1 | P1 BANK 0 | P1 BANK 1 | P2 BANK 0 | P2 BANK 1 | P3 BANK 0 | P3 BANK 1 |
| P0 BANK 2 | P0 BANK 3 | P1 BANK 2 | P1 BANK 3 | P2 BANK 2 | P2 BANK 3 | P3 BANK 2 | P3 BANK 3 |
| P4 BANK 0 | P4 BANK 1 | P5 BANK 0 | P5 BANK 1 | P6 BANK 0 | P6 BANK 1 | P7 BANK 0 | P7 BANK 1 |
| P4 BANK 2 | P4 BANK 3 | P5 BANK 2 | P5 BANK 3 | P6 BANK 2 | P6 BANK 3 | P7 BANK 2 | P7 BANK 3 |

WEST — EAST

SOUTH

VIRTUAL PROCESSOR TECHNIQUES IN A SIMD MULTIPROCESSOR ARRAY

LICENSE TO U.S. GOVERNMENT

This invention was made with Government support under contract no. N00039-84-C-0638 awarded by the Defense Advanced Research Projects Agency. The Government has certain rights in this invention. The U.S. Government is hereby granted a non-exclusive, non-transferrable, irrevocable, paid-up license to practice or have practiced for or on behalf of the United States this invention throughout the world.

CROSS REFERENCES TO RELATED APPLICATIONS

Related applications are "Parallel Processor", Ser. No. 499,474 and "Parallel Processor/Memory Circuit", Ser. No. 499,471, now U.S. Pat. No. 4,709,327, both filed May 31, 1983; "Method and Apparatus for Routing Message Packets," Ser. No. 671,835, filed Nov. 15, 1984 and now U.S. Pat. No. 4,598,400, issued July 1, 1986; "Method and Apparatus for Interconnecting Processors in a Hyper-Dimensional Array," Ser. No. 740,943, filed May 31, 1985; "Method of Simulating Additional Processors in a SIMD Parallel Processor Array," Ser. No. 832,913, filed Feb. 24, 1986, now U.S. Pat. No. 4,773,038; and "Pipelining Technique and Pipelined Processes for Multi-Dimensional Processor Arrays," filed on even date herewith by G. Blelloch et al; all of which are hereby incorporated by reference.

FIELD OF THE INVENTION

This invention relates to the field of parallel processing and multi-processing in digital computer systems. More particularly, it relates to a method of simulating and utilizing additional (i.e., virtual) processors in a single-instruction multiple-data (SIMD) parallel processor array.

BACKGROUND OF THE INVENTION

In a SIMD computer, such as the Connection Machine (Reg. T.M. of Thinking Machines Corporation, Cambridge, MA) computer system, the architecture is designed to support a data parallel style of programming. In this style one programs assuming a separate processor for every data element, so that one may effectively operate on all data elements in parallel.

The Connection Machine computer system supports such a style of programming by providing tens of thousands of individual hardware data processors, each with its own memory for holding a data element. (Current standard Connection Machine system configurations provide 16,384 processors and 65,536 processors.) The data processors all process instructions issued on a centrally controlled instruction bus, so that at any given time all processors (or all processors in a large group) are executing the same instruction. The instruction bus is driven by a front end computer, which is a conventional single-processor computer such as a Symbolics 3600 computer or a Digital Equipment Corporation VAX Computer.

For example, if an ADD instruction is issued, then all processors perform addition, each on its own data. (Most instructions are conditional, so that a flag bit in each processor becomes an additional implicit input to the operation, and the operation's results are stored only in processors whose flag bit is 1.) Many of the usual arithmetic and logic instructions found in contemporary computer instructions sets (such as SUBTRACT, MULTIPLY, DIVIDE, MAX, MIN, COMPARE, LOGICAL AND, LOGICAL OR, LOGICAL EXCLUSIVE OR, and floating-point instructions) are provided in this form; when one such instruction is issued, it is performed (possibly conditionally) by every hardware processor, each on its own data.

Other computer systems of this general style have also been built. Prominent among these are the ICL DAP and the Goodyear MPP. A typical difficulty with these computer systems is that programming becomes much more complicated if the number of data elements in the problem to be solved exceeds the number of hardware processors. The Goodyear MPP, for example, provides 16,384 hardware processors configured in a 128×128 two-dimensional grid. If a problem requires the processing of 200×200 elements (total 40,000), the programming task is much more difficult because one can no longer assign one data element to each processor, but must assign two data elements to some processors. Even if a problem requires no more than 16,384 data elements, if they are to be organized as a 64×256 grid rather than a 128×128 pattern, programming is again complicated, this time because the problem communication structure does not match the hardware communication structure.

SUMMARY OF THE INVENTION

The instruction set of the Connection Machine computer system alleviates these difficulties by supporting a virtual processor mechanism at the lowest level of implementation. The virtual processor mechanism causes every physical hardware processor to be used to simulate multiple "virtual" processors. Each physical processor simulates the same number of virtual processors; the number of virtual procesors simulated by each physical processor is called the VP-ratio. The VP-ratio is software selectable and is determined when the Connection Machine is initialized (i.e., "cold-booted") before running a user application.

Let n stand for the VP-ratio at a given point in time. The virtual processor mechanism causes the memory of each physical processor to be divided into n regions of equal size; each such region is the memory for one virtual processor. The set of virtual processors whose memory is stored the same relative position within each physical memory is called a VP-bank. If the VP-ratio is n, then there are n VP-banks. A VP-bank is a set of virtual processors than can be serviced simultaneously by the physical processors.

Whenever an instruction is processed, each physical processor is time-sliced among the virtual memory regions, performing the operation first as one virtual processor, then another, until the operation has been performed for all virtual processors. Only then is the next instruction accepted from the instruction bus.

Superficially this is similar to a multiprocessor system in which each physical processor is time-shared among several virtual processors. However, the virtual processor mechanism described herein differs from conventional time-sharing techniques (multiprocessor or otherwise) in two important respects: First, in a conventional time-sharing system, the switching of a processor among virtual processes typically occurs at unpredictable times dictated by asynchronously generated events such as interrupts from a real-time clock. By contrast, the present virtual processor mechanism switches each physical processor among the virtual processors in a completely regular, predictable, deterministic fashion. Second, in a conventional time-sharing system the switching of a processor among virtual processes typically occurs between instructions; the physical processor executes some instructions on behalf of one virtual process, and then, after a switch, executes some instructions on behalf of another virtual process. The present virtual processor mechanism, by contrast, switches among virtual processors within instructions; at the completion of each instruction, that instruction has been executed on behalf of all virtual processors.

The model of simply time-slicing physical processors among virtual processors in a round-robin fashion is a simple one, and suffices to explain instructions for which no interprocessor communication occurs. Interesting complications occur when communication is involved. In the description below, we examine in greater detail the processing of five specific instructions in the Connection Machine System instruction set that are illustrative of the handling of virtual processors: ADD, GLOBAL-ADD, PLUS-SCAN, GET-FROM-EAST, and SEND. In each case it is assumed that the operation has already been implemented for physical processors; we then exhibit an implementation of the operation for virtual processors. The detailed description should be read in conjunction with the several sheets of accompanying drawing, which is incorporated by reference herein.

BRIEF DESCRIPTION OF THE DRAWINGS

In the drawing,

FIG. 3 is an illustration of the operation of the ADD instruction of FIG. 2 for eight hardware processors operated as four virtual processor banks in accordance with the present invention, showing the status of the virtual processor banks before the ADD instruction adds B into A;

FIG. 4 is a further illustration of the operation of the ADD instruction showing the states of the VP banks after VP-bank 0 has been processed;

FIG. 5 is a further illustration of the operation of the ADD instruction showing the states of the VP banks after VP-bank 1 has been processed;

FIG. 6 is a further illustration of the operation of the ADD instruction showing the states of the VP banks after VP-bank 2 has been processed;

FIG. 7 is a further illustration of the operation of the ADD instruction showing the states of the VP banks after VP-bank 3 has been processed;

Figure 12:
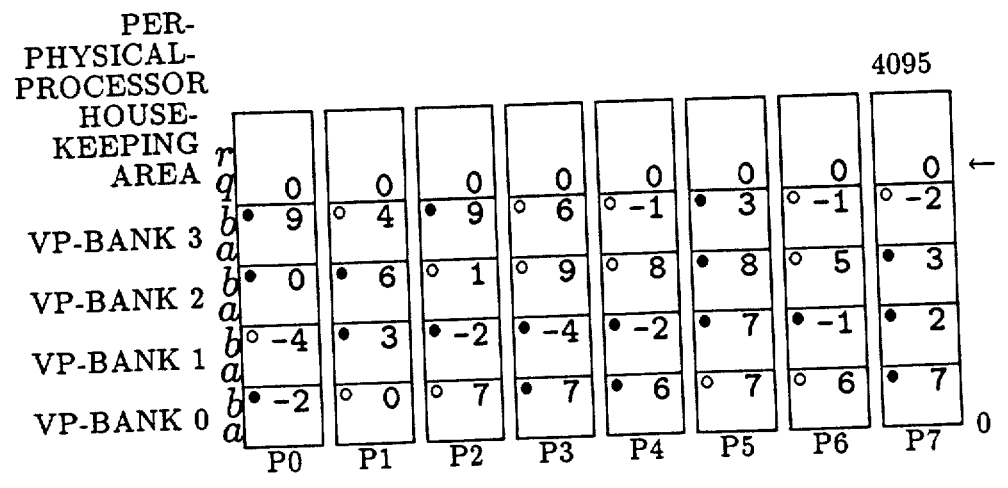
Figure 13:
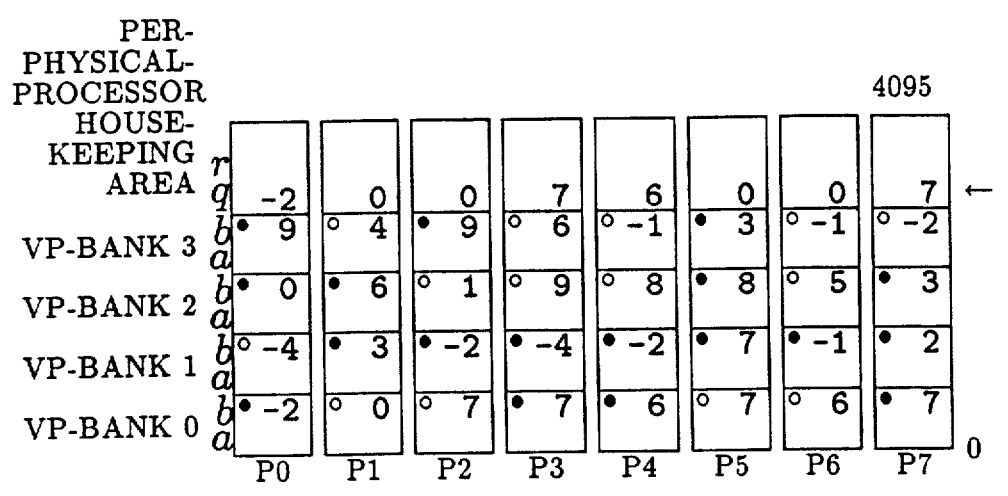

FIGS. 11-17 illustrate, in succession, the contents of the virtual processors initially and at each successive step during the execution of the global-ADD instruction, in accordance with the present invention;

FIGS. 19-29 diagrammatically illustrate, in succession, the contents of each virtual processor before a PLUS-SCAN instruction from field b to field a, and at each successive step in the execution of that instruction;

FIGS. 32-36 illustrate, in succession, the contents of each virtual processor, both before a GET-FROM-EAST instruction from field b to field a and at each successive step during the execution of that instruction;

DETAILED DESCRIPTION OF ILLUSTRATIVE EMBODIMENTS

Example: the ADD operation

The ADD operation causes every virtual processor to add one memory field to another, causing the second one to be altered to contain the sum. Carry and overflow from the operation are recorded also. There are flag bits associated with each virtual processor. Call the total number of flag bits f; in the current Connection Machine computer implementation, f=4. Two of these flag bits (i.e., carry and overflow) function as condition code bits of the usual sort, recording results of operations; another, called context, is the bit that controls whether conditional operations will store their results.

If the VP-ratio is n, then the memory of a physical processor is partitioned into n regions of identical size, but there is more to the story than that. First of all, a certain amount r of each physical processor's memory is set aside for per-physical-processor housekeeping purposes. Second, four bits of memory must be set aside to hold the flag bits of each virtual processor. If m is the total amount of memory per physical processor (4,096 bits in the current implementation), then the amount of memory, v, set aside for each virtual processor is $$v = \left[ \frac{m-r}{n} \right]$$

of which f bits serve as the simulated flag bits of the virtual processor and $v-f$ bits serve as the simulated memory. The v bits of per-processor physical memory set aside for each virtual processor may (but need not) be continguous. If these V bits are continguous, the first $v-f$ bits may be used for the simulated memory, and bits $v-4$ through $v-1$ of each block may contain the simulated flags. In this arrangement, memory bit j of virtual processor k is stored at physical address $kv+j$. Other arrangements are possible, including one where the bits of all virtual processors are interleaved and therefore memory bit j of virtual processor k is stored at physical address $jn+k$.

Figure 1:
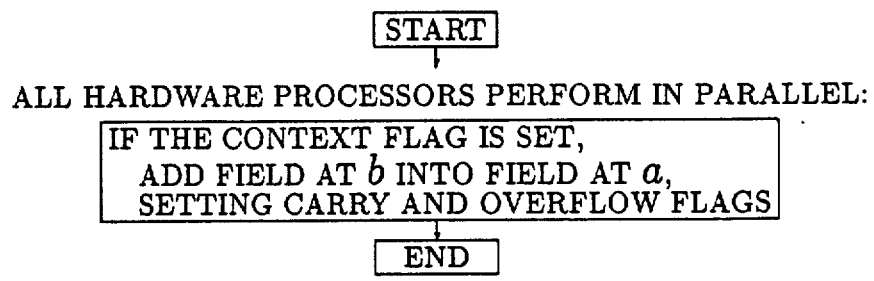
FIG. 1 is an illustration of the general behavior of a single ADD instruction without the virtual processor mechanism of the present invention.

Without the virtual processor mechanism, the general behavior of a single ADD instruction issued by the front end computer with operand addresses a and b would be as shown in FIG. 1.

Figure 2:
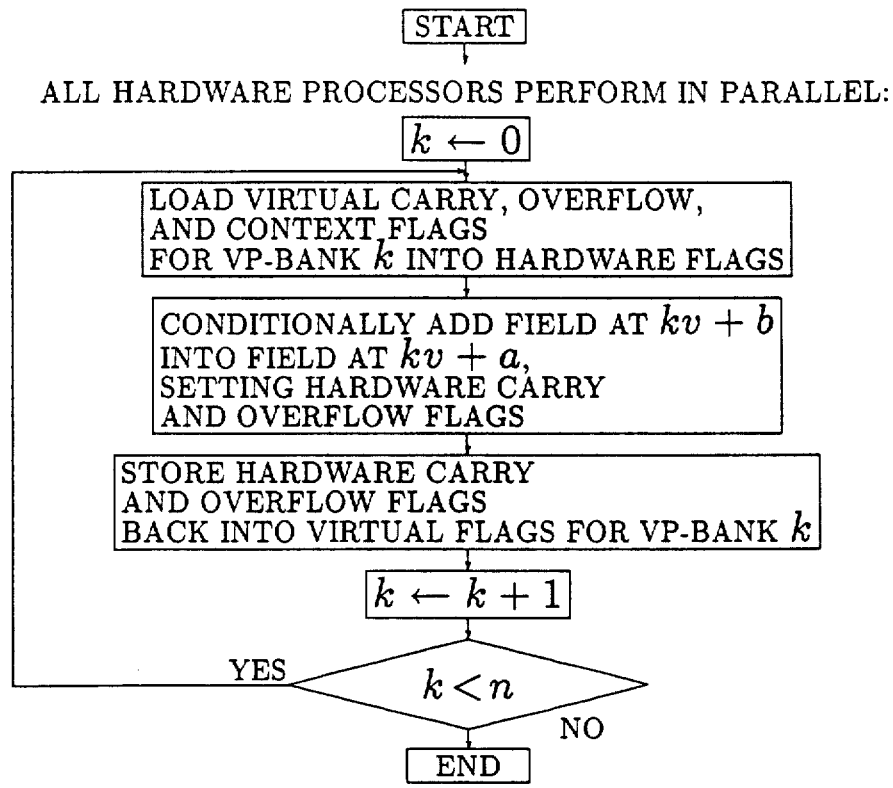
FIG. 2 is an illustration of the general behavior of a single ADD instruction utilizing the virtual processor mechanism of the present invention.

With the virtual processor mechanism, the general behavior of that same single ADD instruction issued by the front end computer is shown in FIG. 2. Note that the test flag is not loaded or stored as it is not used by the ADD instruction, and the context flag is not stored back because it is not used by the ADD instruction. Other instructions, of course, load and store different flags according to need.

FIGS. 3–7 illustrate the operation of the ADD instruction for eight hardware processors and a VP-ratio of four (i.e., there are four VP-banks providing $4 \times 8 = 32$ virtual processors). In these figures, the context flag is represented as a bullet (•) for the value 1 or as a circle (O) for the value 0. Remember that results are stored only in virtual processors whose context flag is 1. The carry and overflow flags are not represented in the figures. In each of FIGS. 4–7, an arrow (←) indicates the places where that figure differs from the preceding one. For uniformity with later figures, the per-physical-processor houskeeping area is shown even though it is not used for the ADD instruction.

Figure 8:
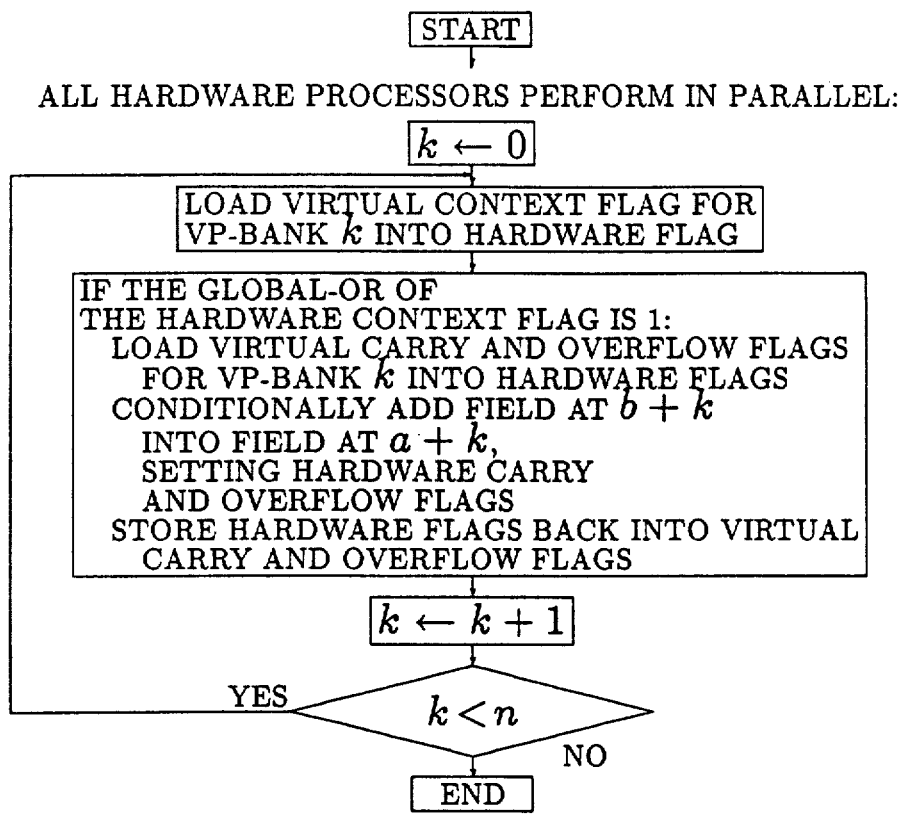
FIG. 8 is an illustration of the methods steps for executing the ADD instruction for virtual processors, in accordance with the present invention, optimized to take advantage of the availability of a global-OR bit.

A refinement of this technique allows conditional instructions of this sort to be executed much more efficiently in some cases. There is a hardware mechanism in the Connection Machine system that can compute the logical OR of one bit from every hardware processor. This result is called the global-OR bit. For each VP-bank, the global-OR of the context flags for all virtual processors in that bank can be checked quickly; if the global-OR bit is zero, then no virtual processor in that bank will store results, and the labor of computing the sums can be avoided, as shown in FIG. 8. For some user applications this technique can yield a significant speed improvement.

Example: GLOBAL-ADD

Without virtual procesors, the GLOBAL-ADD instruction causes one integer from each hardware processor whose context flag is set to be contributed to an accumulating sum; the total sum of all such integers is reported to the front end computer. The memory and flag bits of the individual processors are not changed (except for scratch space in a reserved housekeeping area of memory not visible to the user, that is, front end computer).

Figure 9:
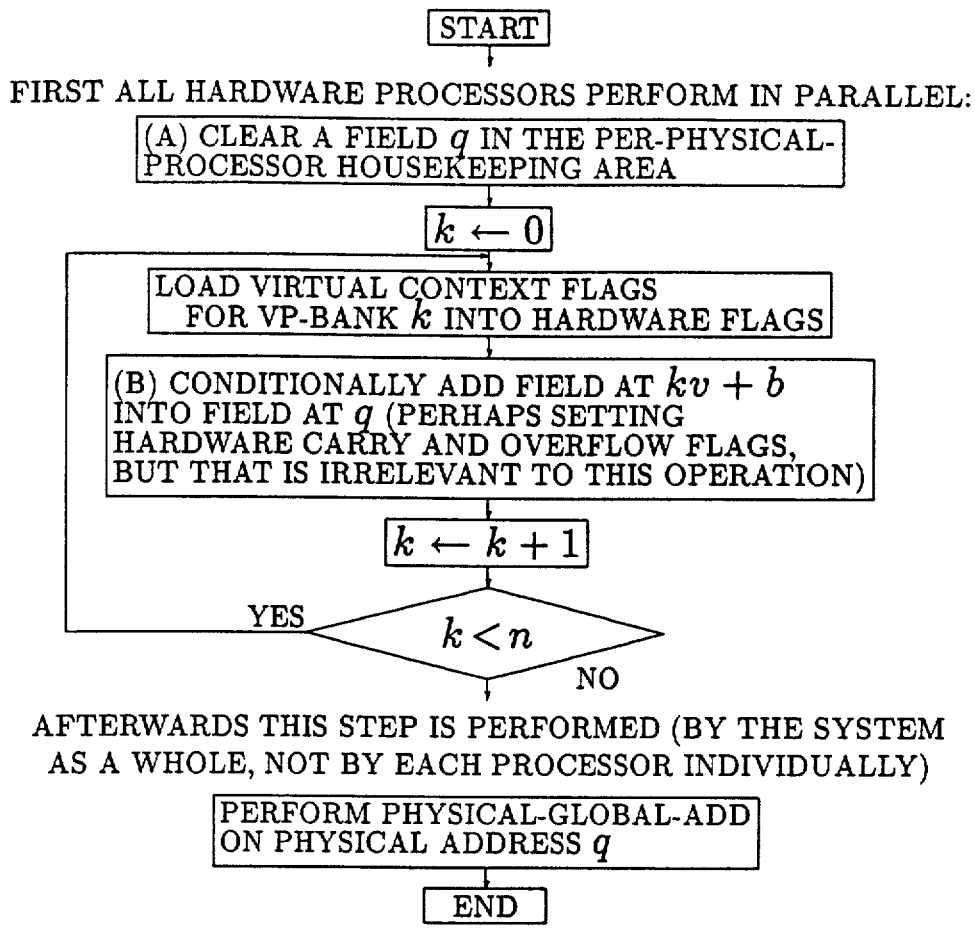
FIG. 9 is an illustration of the method steps for executing the global-ADD instruction for virtual processors, in accordance with the present invention.

For purposes of exposition let us call the foregoing operation PHYSICAL-GLOBAL-ADD. The effect of the GLOBAL-ADD instruction on the field at virtual address b under the virtual processor mechanism may then be described as shown in FIG. 9.

Figure 10:
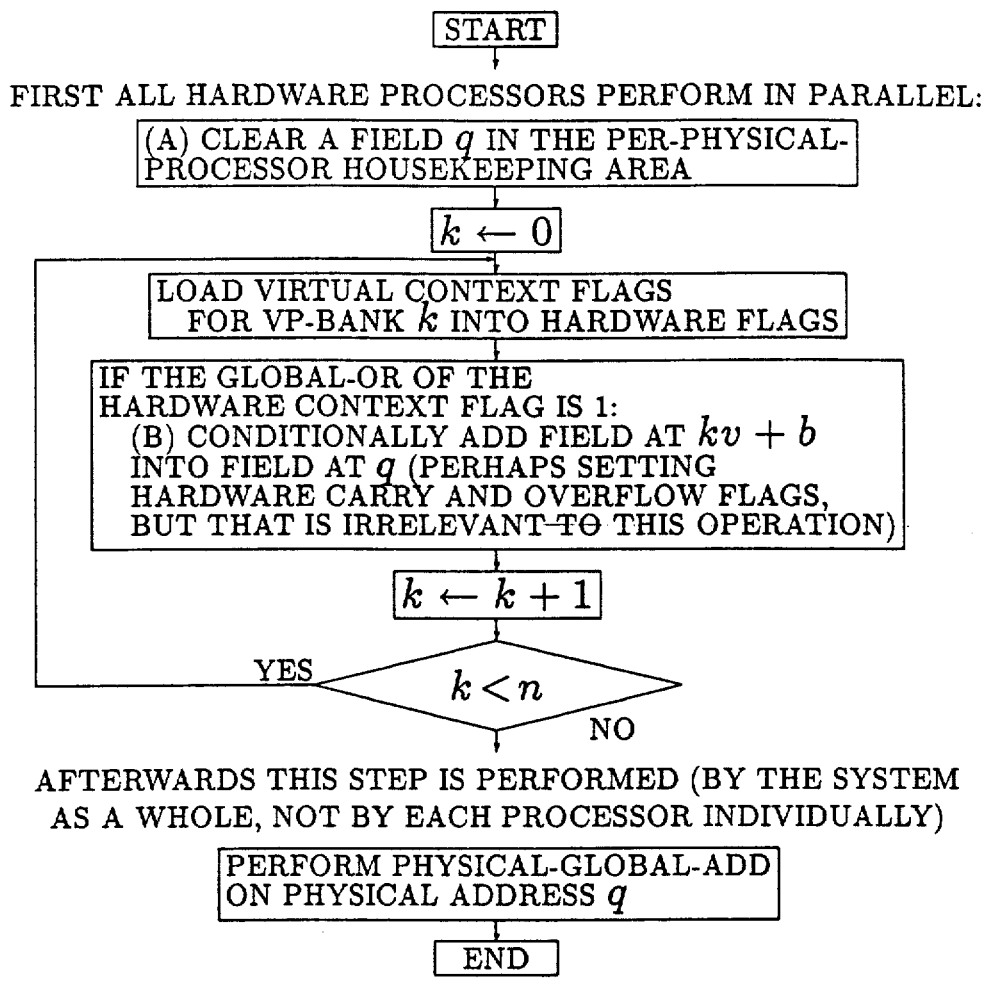
FIG. 10 is an illustration of the steps for executing the global-ADD instruction for virtual processors in accordance with the present invention, optimized to take advantage of the presence of a global-OR bit.

The same VP-bank skipping technique described above for the ADD instruction may be used to potentially speed up GLOBAL-ADD as well (see FIG. 10). (For the remainder of this description we will not include or mention this technique further; it is easily incorporated into other operations where appropriate.)

FIGS. 11–17 illustrate the operation of the conditional GLOBAL-ADD instruction for eight hardware processors operated as four VP-banks.

Example: PLUS SCAN

For the discussion of ADD and GLOBAL-ADD it was not necesary to distinguish one virtual processor from another, as they all participate equally and indistinguishably in those operations. Other operations do distinguish among virtual processors, though.

Every physical processor has a distinct processor number, or address. In a 65,536-processor Connection Machine system, the physical processors are numbered from 0 to 65,535. (Note that $65,536 = 2^{16}$, so a processor number may be represented in 16 bits, for example.)

The virtual processor mechanism also assigns a distinct number to each virtual processor. The VP-banks are numbered from 0 to $n-1$. The virtual processor in physical processor j and in VP-bank k then has virtual processor number $jn+k$. (In the current implementation, the VP-ratio is restricted to be an integral power of 2. This is primarily for implementation convenience, so that the physical processor number is simply one bit field of the virtual processor number that can be extracted without performing a division operation).

Without virtual processors, the unconditional PLUS-SCAN instruction with operand addresses a and b causes field a in hardware processor j to receive the integer sum of fields b from every hardware processor whose processor number k is strictly less than j. Call this PHYSICAL-PLUS-SCAN-ALWAYS. Its conditional analogue, PHYSICAL-PLUS-SCAN, causes field a in hardware processor j to receive (provided that the context flag of processor j is 1) the integer sum of fields b from every hardware processor whose processor number k is strictly less than j and whose context flag is 1. The flag bits of the individual processors are not changed.

Figure 18A:
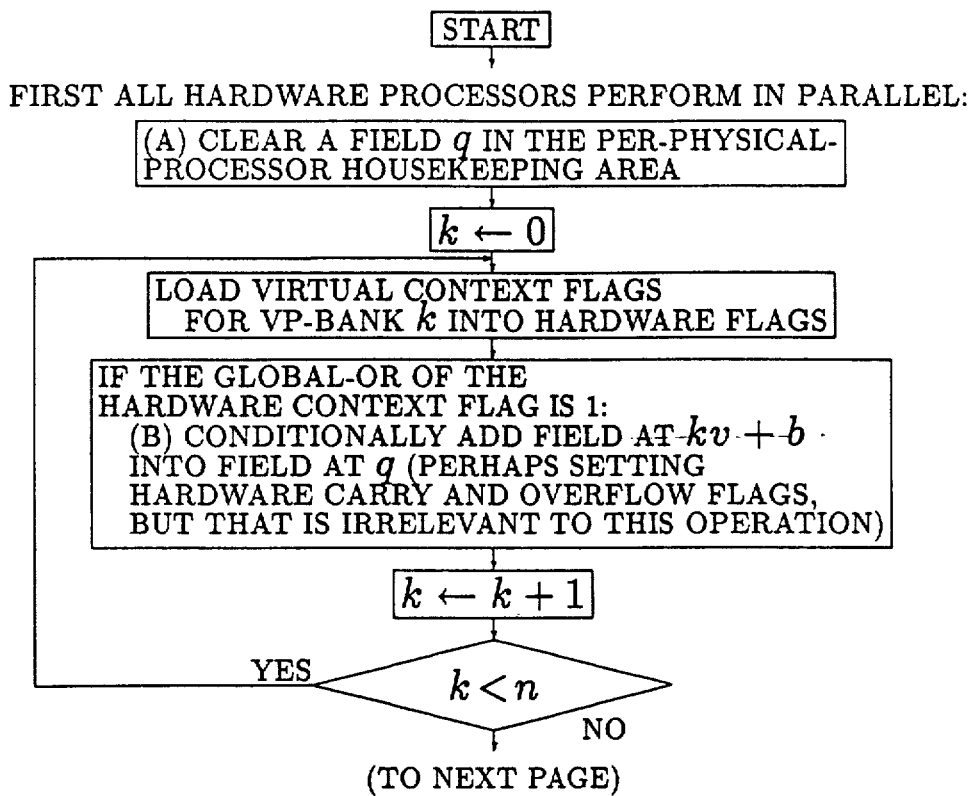
FIGS. 18A and 18B together illustrate the method steps for executing the PLUS-SCAN instruction for virtual processors in accordance with the present invention.
Figure 18B:
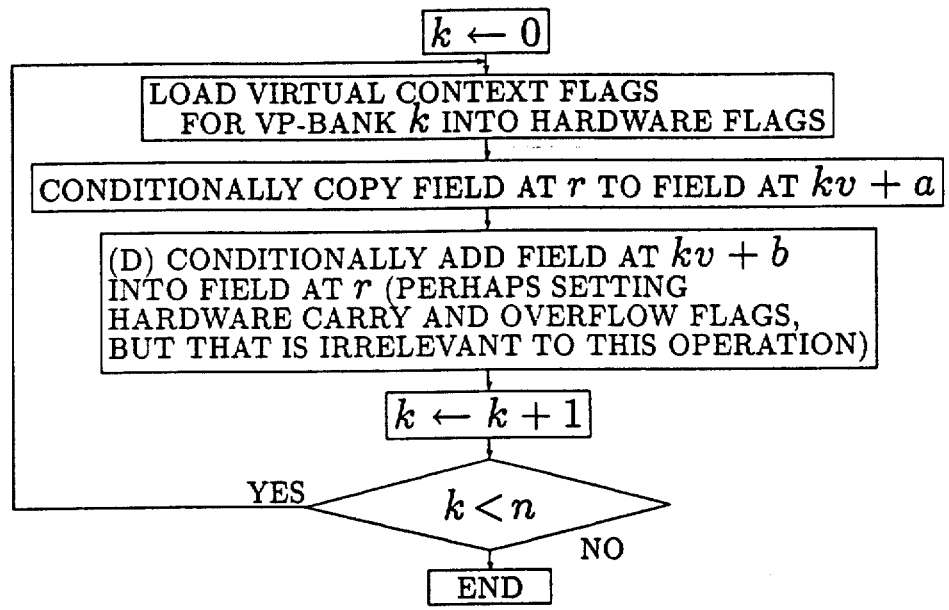
Figure 19:
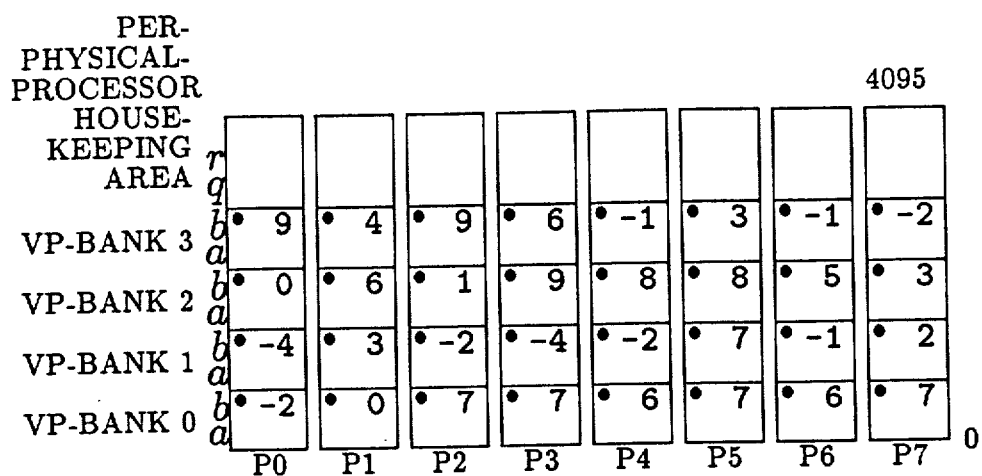
Figure 20:
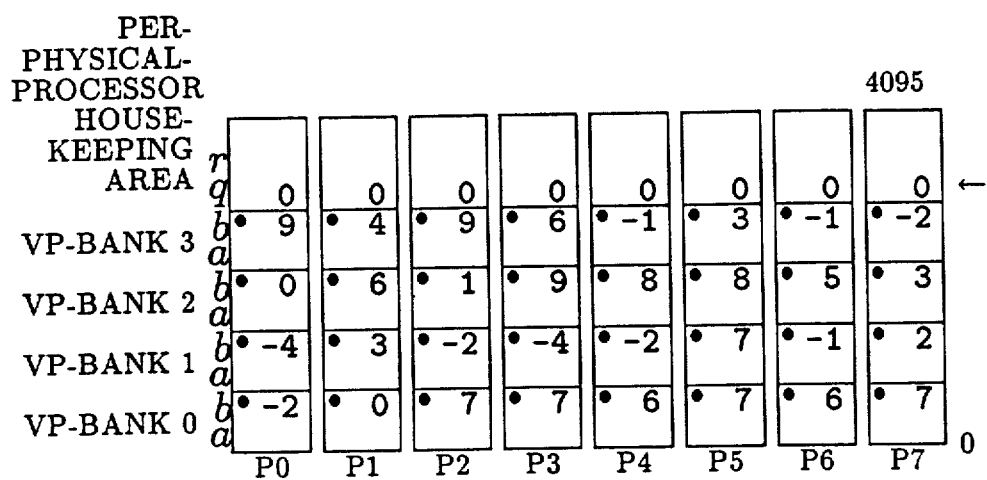

The operation of the conditional PLUS-SCAN operation on virtual procesors is illustrated in FIGS. 18A and 18B. (The unconditional version is obtained simply by changing any and all conditional subsidiary operations to be unconditional; all loading of the hardware context flag may then be eliminated.) The first part (steps (A) and (B)) resembles the first part of the GLOBAL-ADD algorithm for FIG. 9. In step (C), an unconditional plus-scan on physical processors is performed. Steps (D) spread results back to the virtual processors within each physical processor.

FIGS. 19–29 illustrate the operation of the PLUS-SCAN instruction for eight hardware processors operated as four VP-banks. In this example, the context flag of every processor is 1, so the operation is effectively unconditional. Observe that at the end of the operation, the field r in the highest-numbered physical processor contains the total sum of fields b from all virtual processors.

Example: GET-FROM-EAST

The hardware NEWS grid of the Connection Machine organizes physical processors in a regular manner into a two-dimensional grid wherein each processor communicates with its north, east, west and south neighbors. A given physical processor's x and y coordinates within the grid can be calculated from its processor number. We will write these functions of a processor number j as $X(j)$ and $Y(j)$, respectively. If the total number of processors is P, and $P_x$ and $P_y$ are the dimensions of the hardware grid, then $P_xP_y=P$. Given the x and y coordinates of a physical processor, we can calculate its processor number as $P(x,y)$. Therefore we have $P(X(j), Y(j))=j$, $X(P(x,y))=x$, and $Y(P(x,y))=y$.

The hardware grid is so organized that every physical processor has four neighbors. The neighbors of processor j are processors with numbers $P(X(j-1) \mod P_x), Y(j))$, $P(X((j+1) \mod P_x),Y(j))$, $P(X(j),Y((j-1) \mod P_y))$ and $P(X(j), Y((j+1) \mod P_y))$. These are respectively called the neighbors to the West, East, North and South. There are instructions, one for each of the four directions, that cause every processor to receive data from its neighbor in that direction; the processor then stores that data into memory. Each instruction comes in conditional and unconditional varieties; the conditional form causes each processor to store the incoming data only if its context flag is 1. The virtual processor mechanism organizes the virtual processors within a physical processor into a small grid. If the VP-ratio is n, then the small grid may be of shape $n_x$ by $n_y$, where $n_x$ and $n_y$ are any two integers such that $n_xn_y=n$. A virtual processor in VP-bank k has coordinates $X_v(k)$ and $V_v(k)$ within this small grid.

The small grids within the physical processors are conjoined like the patchwork squares in a quilt to make one large grid of size $P_xn_x$ by $P_yn_y$. The virtual processor in VP-bank k of physical processor j has, as already stated above, virtual processor number $jn+k$. That same virtual processor then has virtual NEWS coordinates $X(j)n_x+X_v(k)$ and $Y(j)n_x+Y_v(k)$. The virtual processor with virtual NEWS coordinates $x_v$ and $y_v$ has virtual processor number $P_v(x_v,y_v)$.

When data is received from a virtual neighbor to the East, for example, virtual processors that are on the East edge of their small grid will need to receive data that is in another physical processor; all other virtual processors receive data from virtual processors that are within the same virtual processor.

Figure 30:
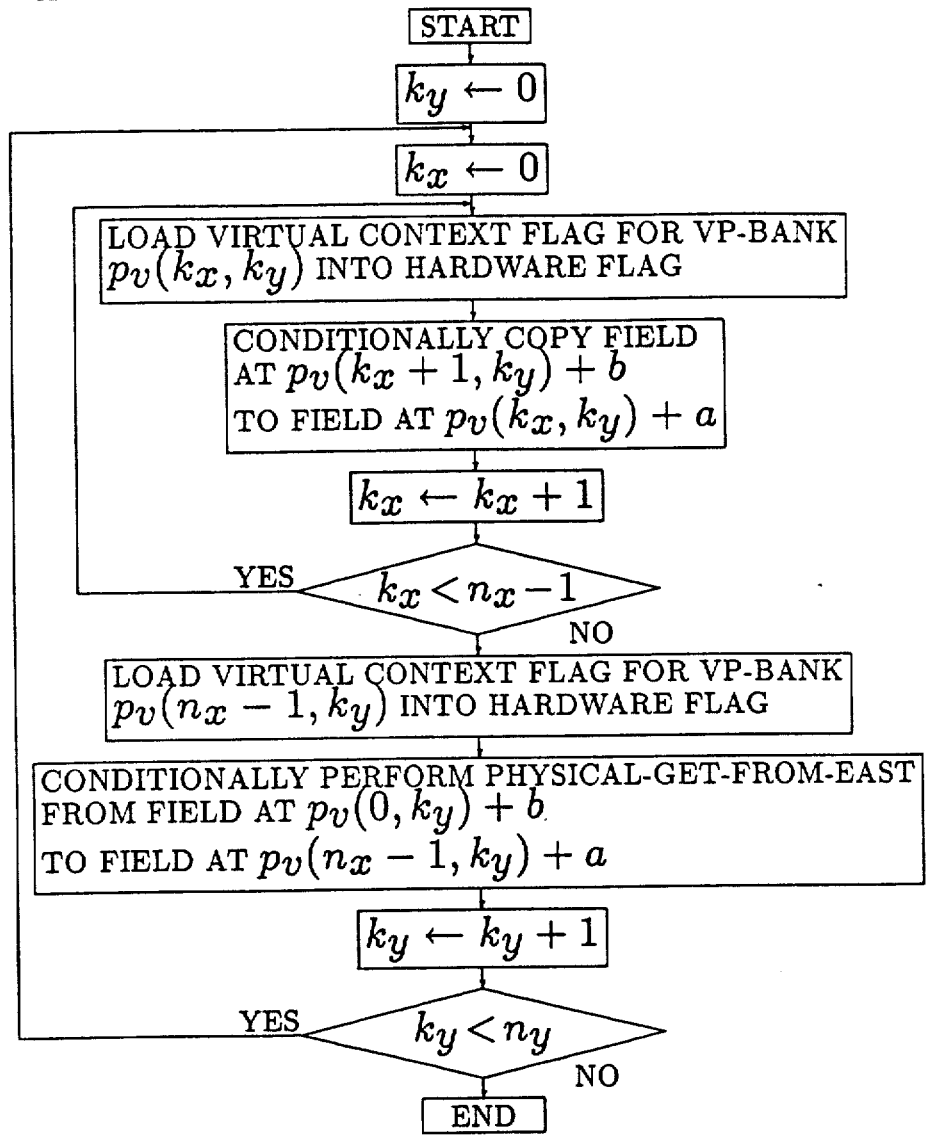
FIG. 30 illustrates the method steps for executing the GET-FROM-EAST instruction for virtual processors, in accordance with the present invention.

FIG. 30 depicts the general behavior of the instruction GET-FROM-EAST, with the virtual processor mechanism, sending out data from field b and receiving it into the distinct field a. (The unconditional version is obtained simply by changing any and all conditional subsidiary operations to be unconditional; all loading of the hardware context flag may then be eliminated).

Figure 31:
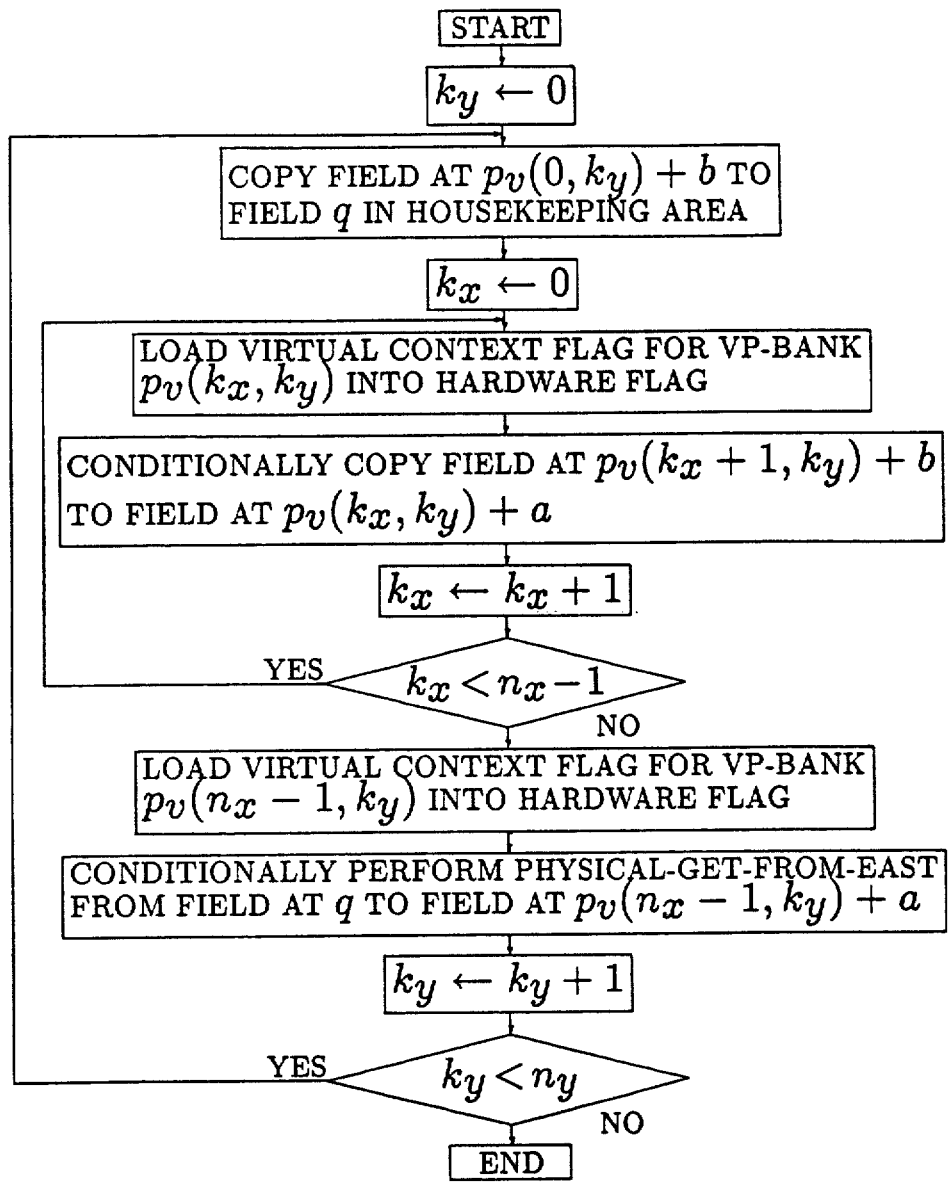
FIG. 31 illustrates a variation on the method of FIG. 30 wherein fields a and b are to be the same field and only scratch area is used within each physical processor.

If the virtual fields a and b are to be the same field, an extra scratch field may be used within each virtual processor. Or a single scratch area may be used within each physical processor, thereby conserving memory, as shown in FIG. 31. (The unconditional version is obtained simply by changing any and all conditional subsidiary operations to be unconditional; all loading of the hardware context flag may then be eliminated.)

Figure 34:
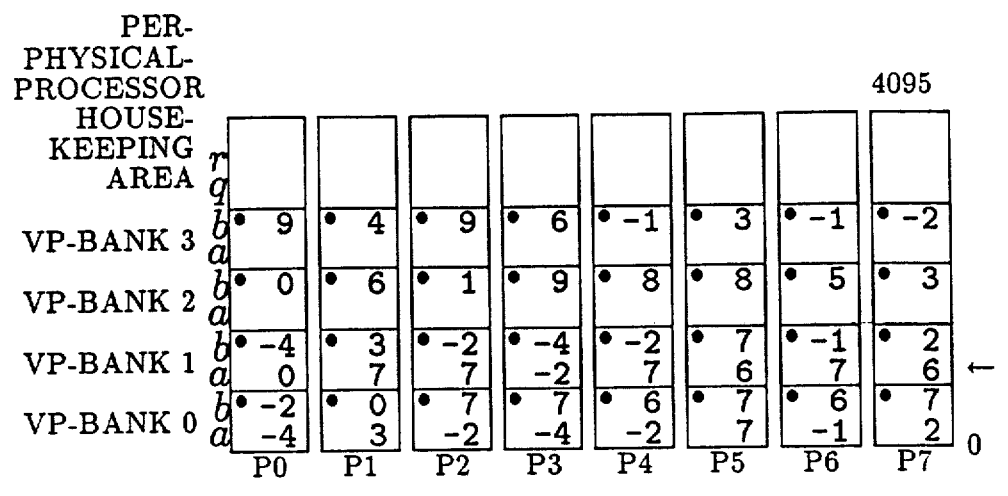
Figure 37:
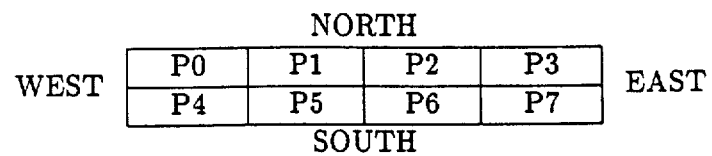
FIG. 37 diagrammatically illustrates the two-dimensional grid into which the eight physical processors P0-P7 are organized for the operation of FIGS. 32-36.

FIGS. 32–36 illustrate the operation of the GET-FROM-EAST instruction for eight hardware processors operated as four VP-banks, using the method of FIG. 30 to put a shifted copy of field b into field a. Assume that the physical processors P0 through P7 are organized into a physical grid as shown in FIG. 37.

Figure 38:
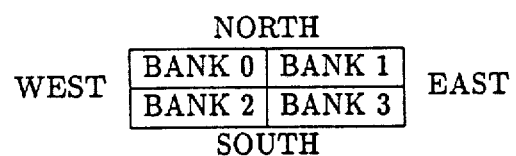
FIG. 38 diagrammatically illustrates the grid into which the virtual processors in banks 0-3 are organized for use, in cooperation with the physical grid of FIG. 37, for execution of the GET-FROM-EAST instruction in accordance with FIG. 32-36.
Figures 39, 40:
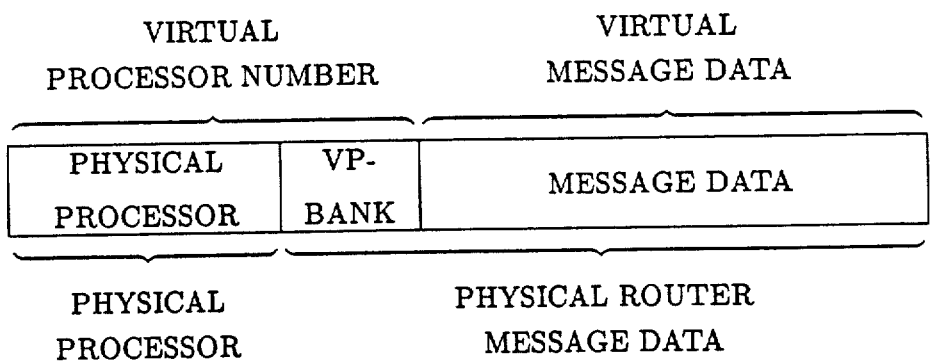
FIG. 39 diagrammatically illustrates the overall virtual NEWS GRID represented by the combination of FIGS. 37 and 38.
FIG. 40 is a diagrammatic illustration of the message format supplied to the virtual router in accordance with the present invention, for execution of the SEND instruction.

Assume further that within each physical processor the virtual processors in banks 0 through 3 are organized into a small grid as shown in FIG. 38. The overall virtual NEWS grid therefore is represented by FIG. 39. In the example shown in FIGS. 32–36 the context flag of every processor is 1, so the operation is effectively unconditional.

Example: SEND

The physical-processor version of the SEND instruction relies on special purpose hardware (the router detailed in the above-noted U.S. Pat. No. 4,598,400 and application Ser. No. 499,474, both incorporated by reference herein) to transmit messages from one processor to another. The actual hardware implementation is quite complex, but for the purposes of this discussion may be summarized abstractly as follows. Each processor is attached to a router node. (In the actual hardware each router node services several processors, but that fact is not important here.) Suppose that physical processor g (the sender) is to send message m to physical processor h (the destination). Processor g furnishes to its router the physical processor number of h and the message data m (effectively concatenated into one long string of bits). The router node then forwards the data m to the router node connected to physical processor h. That router then stores m into the memory of physical processor h. Of course, while all this is going on other physical processors may also have requested delivery of other messages to other destinations.

There is an additional piece of hardware (the "message detector" of U.S. Pat. No. 4,598,400, incorporated by reference) that, among other functions, can cause the delivery of a message to its destination to be conditional upon the message data. In our example, it might be specified that only messages whose first three bits are 101 are to be stored into the memories of their respective destination processors. All other messages remain buffered within the router nodes. It might next be specified that messages whose first three bits are 110 are to be stored, and so on.

For each such directive (to store only certain messages) a different memory address may be supplied. To go over the same example in more detail, it might be specified that only messages whose first three bits are 101 are to be stored, and they are to be stored at address 2570. It might next be specified that messages whose first three bits are 110 are to be stored at address 3082; next that message whose first three bits are 111 are to be stored at adddress 3594; and so on.

As seen from a physical processor, then, message transmission may be abstractly divided into two phases: (1) inject a message into the router, perhaps conditionally on the context flag; (2) receive a message from the router, if one has been sent and if the message detector permits.

The message detector makes it possible to support the efficient transmission of messages among virtual processors. If virtual processor u is to send message m to virtual processor w, it provides to the "virtual router" the virtual processor number of w and the message data m (effectively concatenated into one long string of bits).

Because in the current implementation the VP-ratio is constrained to be a power of two, a virtual processor address is simply the concatenation of a physical processor address and a VP-bank number. The message information supplied to the virtual router can therefore be interpreted by the physical router hardware as consisting of a physical processor number followed by a somewhat longer message data string (which consists of a VP-bank number followed by the virtual message data m), as illustrated in FIG. 40.

The method therefore requires the delivery of the message to the physical processor that contains w and then the use of the message detector to ensure that the message data is stored at a location within the memory set aside for the VP-bank that contains w. This method for sending data from field b to field a in the virtual processor specified by field d is outlined in FIG. 41.

Figure 41:
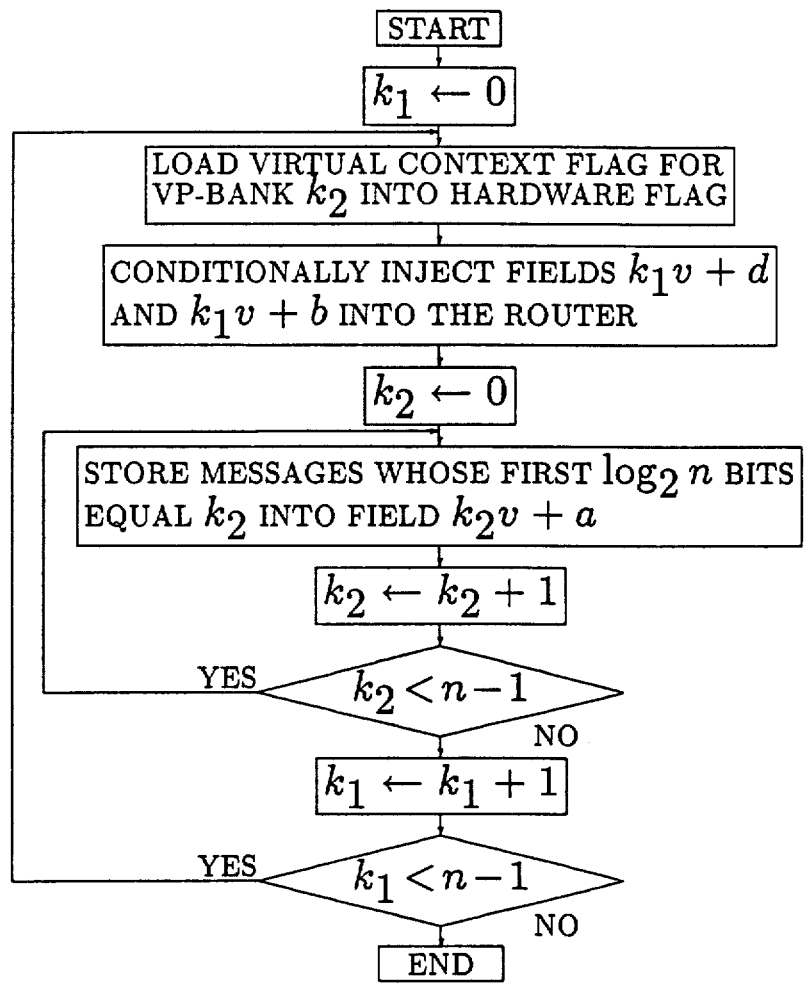
FIG. 41 illustrates the method steps for execution of the SEND instruction for virtual processors, in accordance with the present invention.

The method shown in FIG. 41 unfortunately takes a number of steps proportional to the square of the VP-ratio. In practice, a more complex method may be used. The latter takes advantage of the buffering within the physical router, plus three additional features of the router hardware not yet discussed: (1) Injection and storing of messages may take place concurrently. (2) It is not always possible, because of buffer limitations, for every physical processor to inject a message simultaneously. Instead, the protocol is that every physical processor may attempt to inject a message, and the router returns to the processor a bit that is 1 if the message was injected and 0 otherwise. (3) The global-OR facility may also be used to determine whether any router node still has messages buffered within it.

Figure 42A:
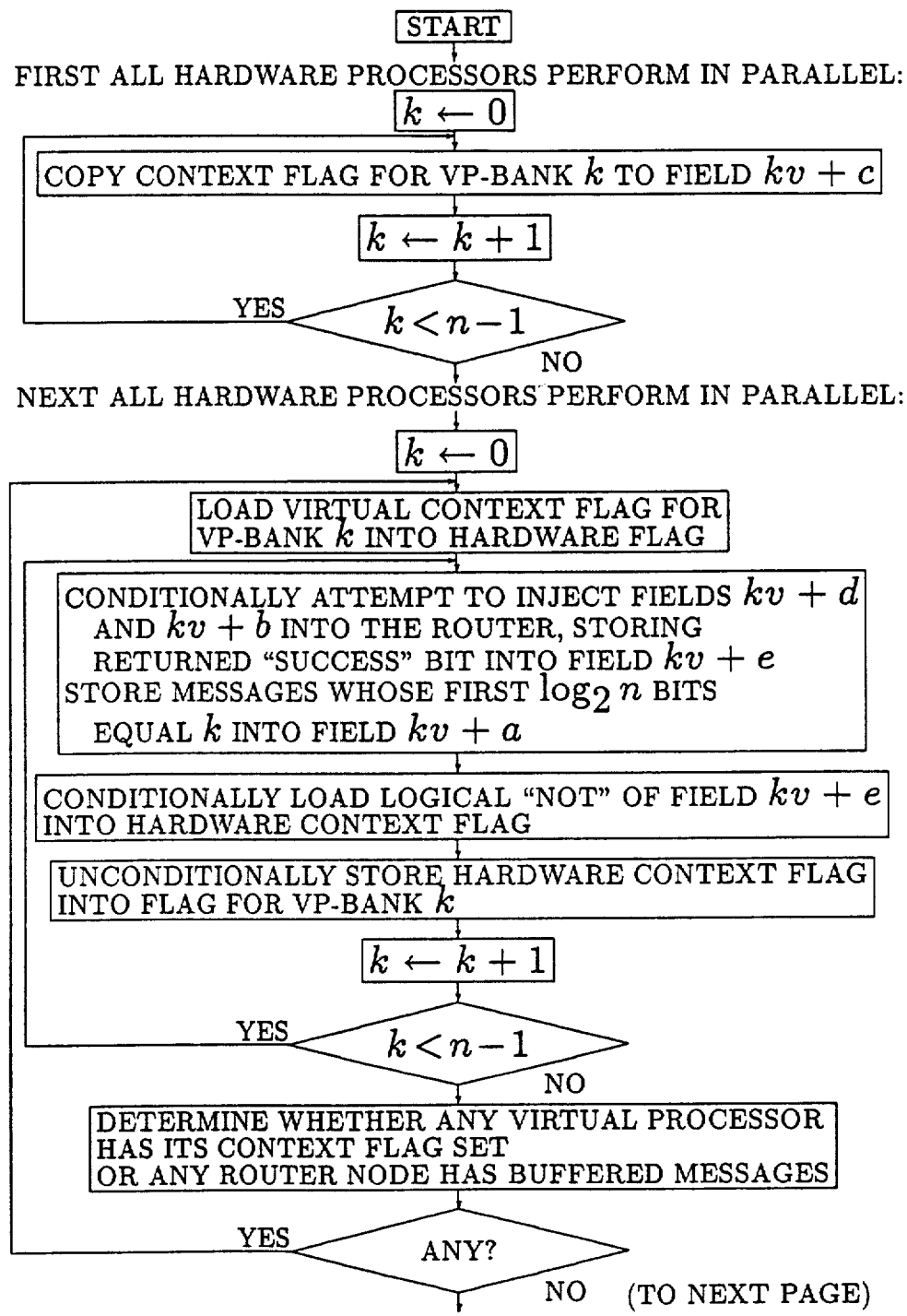
FIGS. 42A and 42B together illustrate the method steps for execution of an improved SEND instruction for virtual processors, in accordance with the present invention.
Figure 42B:
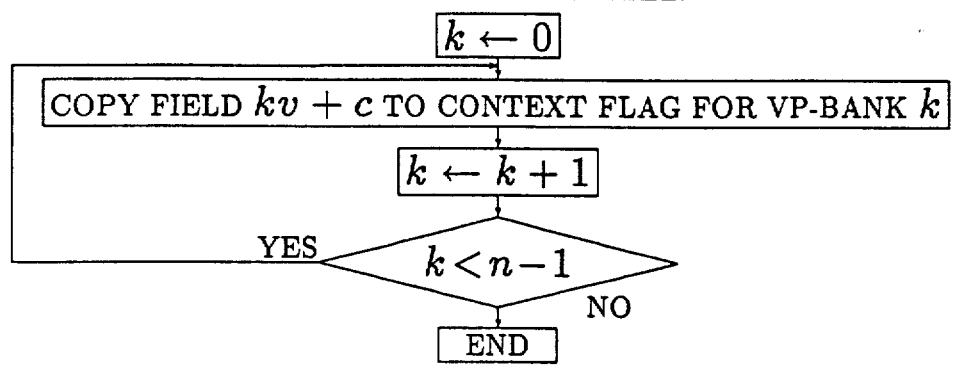

The improved method is shown in FIGS. 42A and 42B. It assumes that there are two additional one-bit fields called c and e in each virtual (not physical) processor. In the worst case this methods can still take time proportional to the square of the VP-ratio, but empirical results show that in practice its performance is considerably better than the performance of the method in FIG. 41. Of course, many other strategies are possible with the given hardware.

SUMMARY

The five instructions ADD, GLOBAL-ADD, PLUS-SCAN, SEND, and GET-FROM-EAST are handled by the instant virtual processor mechanism in a variety of ways:

(1) The ADD instruction simply iterates over VP-banks, performing the operation in each bank. The virtual processors do not interact.

(2) The GLOBAL-ADD instruction obtains the effect of gathering up information from all processors by gathering up partial results from all virtual processors within each physical processor and then gathering up a higher level or partial results from all physical processors.

(3) The PLUS-SCAN instruction obtains the effect of a prefix-sum operation over all virtual procesors in three sets: (1) summarizing the data for all virtual processors within each physical processor, (2) performing a prefix-sum over physical processors, and then (3) spreading the results within each physical processor back to the virtual processors.

(4) The GET-FROM-EAST instruction performs some inter-virtual-processor data movement within each physical processor and uses the physical grid communication mechanism to accomplish the remaining data movement.

(5) The SEND instruction takes advantage of special buffering and pattern-matching mechanisms in the router hardware.

Despite the variety of mechanisms used in the implementation, the overall goal is the same in each case: to support the appearance to the front end computer of a much larger number of processors than are actually implemented discretely in hardware.

Having thus described the virtual processor mechanism and a number of instructions specifically adapted for use with that mechanism, it will be readily apparent that alterations, modifications and improvements thereto will readily occur to those familiar with the art. Such obvious modifications, alterations and improvements are intended to be suggested by this disclosure and are therefore within the spirit and scope of the invention. Accordingly, the foregoing description is intended to be exemplary only, and not limiting. The invention is limited only as defined by claims appended hereto, and by their equivalents.

What is claimed is:

1. In a single-instruction multiple data (SIMD) parallel processor comprising a controller and an array of physical processors controlled in parallel by instructions supplied by said controller, each processor comprising an input, an output, a processing element and an associated memory element coupled to said processing element for storing information from and supplying information to the processing element and comprising at least one memory location, the processing element operating on data provided by its input and said associated memory element, in accordance with instructions provided by said controller, to produce data at its output, a method of simulating the presence of a larger number of processors in the array than the number of said physical processors, thereby to provide a corresponding number of so-called "virtual processors" usable for executing user programs, and of utilizing said virtual processors, comprising the steps of:

(a) before executing a user program, subdividing the memory elements asociated with each of a plurality of physical processing elements to form a plurality of m sub-memories associated with each processing element each of v bits in length, where m is a variable number provided before a user program is executed and m may range from 1 to at least tens of thousands;

(b) providing an instruction from the controller to a set of the physical processors to cause the processing elements thereof to process data stored at a corresponding location in a first sub-memory associated with each such processing element; and (c) at a subsequent time within a time allowed for the execution of said instruction, providing said instruction from the controller to such set of physical processors to cause the processing elements thereof each to process data stored at a corresponding location in a second sub-memory associated with each such processing element.

2. The method of claim 1 wherein the instruction is an ADD instruction intended to cause the virtual processor to add together a multiplicity of numbers, and wherein a set of virtual processors having associated sub-memory in the same relative position within each memory element is termed a "VP-bank," such method comprising the additional step of:

(d) for each VP-bank, (i) loading virtual carry, overflow and context flags for VP-bank k into respective hardware flag bits, (ii) conditionally adding the field at location kv+b into the field at kv+a, where a and b are operand addresses, (iii) setting hardware carry and overflow flag bits as appropriate, and (iv) storing hardware carry and overflow flags back into virtual flags for VP-bank k.

3. The method of claim 1 or claim 2 further characterized by the additional step of:

(e) providing for each virtual processor a number of flag bits, f, first and second ones of said flag bits functioning as condition code bits, recording the results of operations, and a third flag bit controlling whether the results of conditional operations will be stored.

4. The method of claim 1 wherein the physical processors are functionally identical.

* * * * *